Jan. 6, 1959
E. J. HOUDRY ET AL
2,867,497
METHOD OF CATALYTICALLY PURIFYING EXHAUST
GASES AND REGENERATING THE
CATALYST UTILIZED THEREIN
Filed March 28, 1955
2 Sheets-Sheet 1
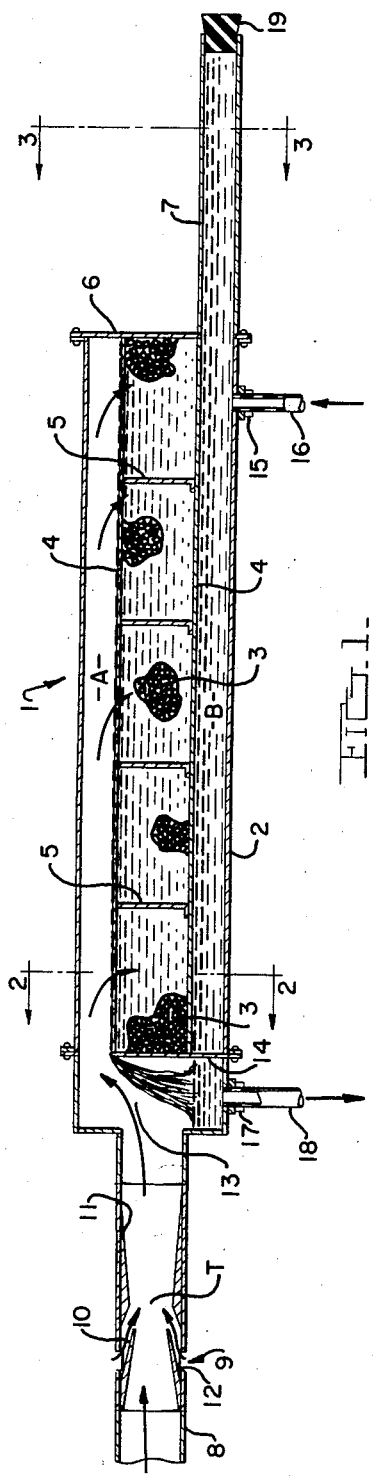
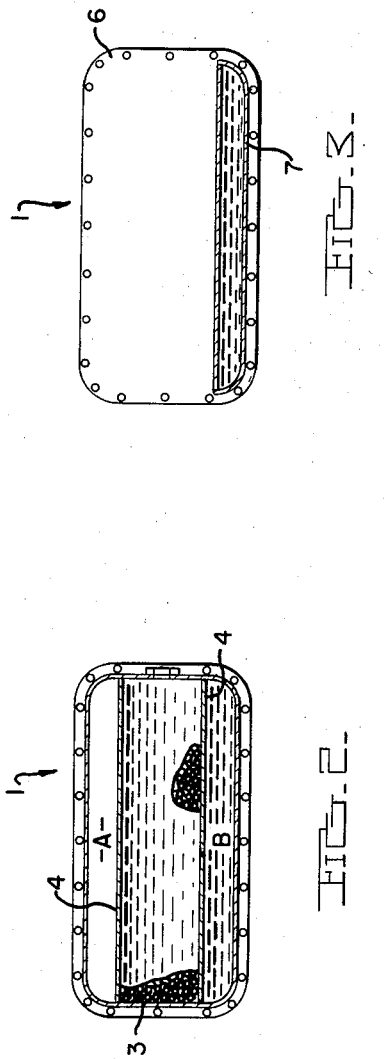
INVENTOR.
EUGENE J. HOUDRY
WILLARD R. CALVERT
BY
ATTORNEY

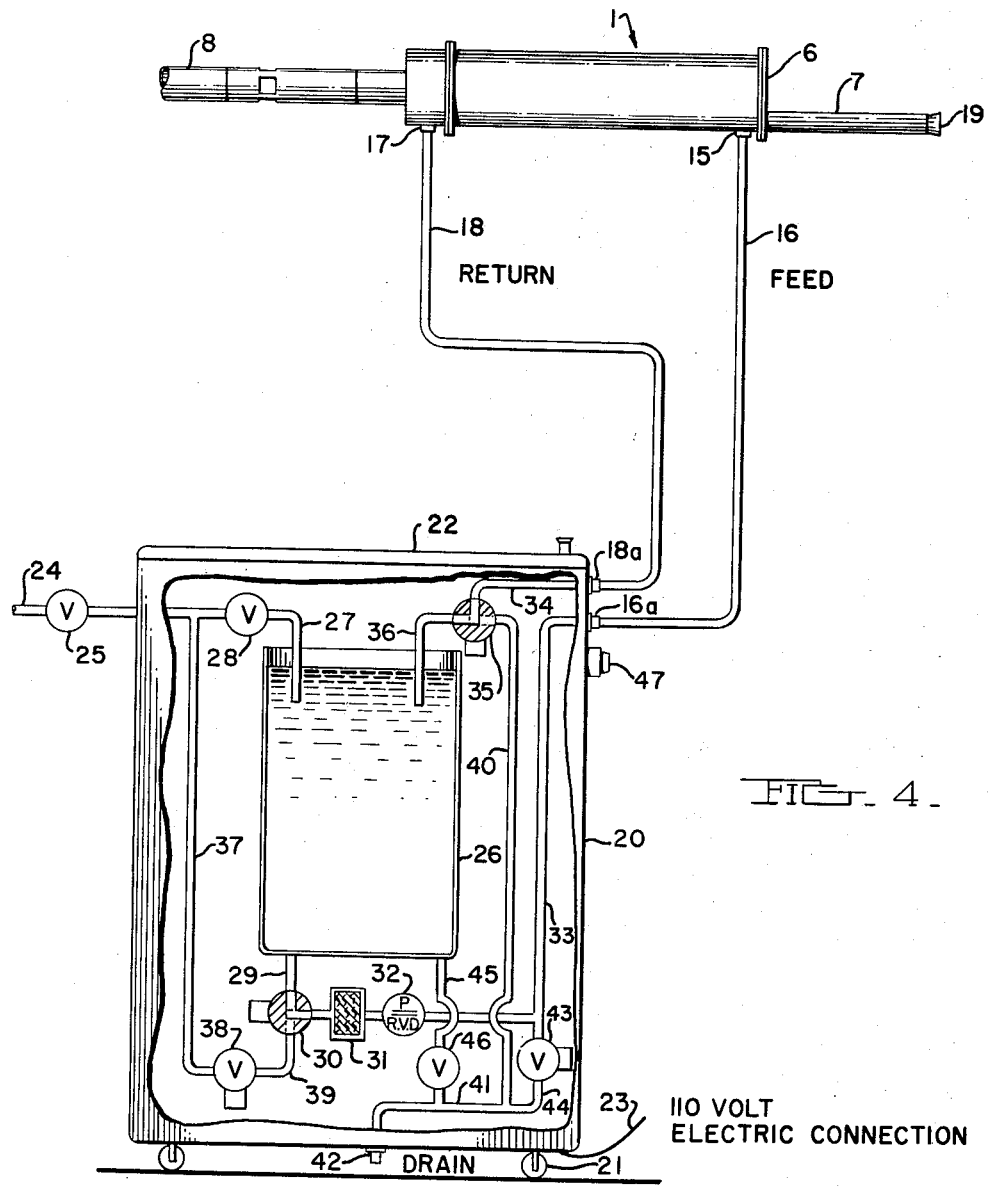

United States Patent Office 2,867,497
Patented Jan. 6, 1959

2,867,497

METHOD OF CATALYTICALLY PURIFYING EXHAUST GASES AND REGENERATING THE CATALYST UTILIZED THEREIN

Eugene J. Houdry, Ardmore, and Willard R. Calvert, Ridley Park, Pa., assignors to Oxy-Catalyst, Inc., a corporation of Pennsylvania Application March 28, 1955, Serial No. 497,116

8 Claims. (Cl. 23—2)

This invention relates to the catalytic purification of exhaust gases from internal combustion engines and is particularly concerned with the purification of exhaust gases from engines using leaded gasoline.

It has long been recognized that exhaust gases from gasoline operated internal combustion engines contain significant concentrations of carbon monoxide and other oxidizable materials such as hydrocarbons both saturated and unsaturated, and oxygenated organic compounds including aldehydes and organic acids. The concentration of carbon monoxide in exhaust gases ranges from as high as 10% at idling conditions to approximately 0.5% when the engine is operating under load and/or high speeds. The fact that the exhaust gases of gasoline engines contain dangerous concentrations of carbon monoxide has been well recognized for many years. In the last several years, with the greatly increased concentration of automobile traffic, particularly in urban areas, it has become apparent that the relatively small concentrations of hydrocarbons and oxygenated organic compounds in the exhaust gases are serious contributors to the ever increasing problem of air pollution.

The use of catalytic purifiers to catalytically oxidize the oxidizable fumes in the exhaust gases has been suggested many times in the past as a means for purifying the exhaust gases of its objectionable constituents. Few of the devices however heretofore suggested have achieved any commercial acceptance. Of late years, the almost universal use of so-called "leaded" gasolines has increased the difficulty of purification of exhaust gases both by introducing another undesirable contaminant in the exhaust gases in the form of lead compounds formed in the engine and exhausted therefrom, and by increasing the difficulty of purifying the gases by means of catalytic oxidation. The term "leaded gasoline" as is commonly used and as also used herein, refers to a gasoline to which has been added a compound of lead, most usually tetraethyl lead, for the purpose of increasing the octane rating of the gasoline. The tetraethyl lead, which is usually added together with halogenated compounds which inhibit the deposition of the lead on the cylinder walls, is added to the gasoline in relatively small amounts, such for example as an amount equivalent to 3 grams of metallic lead per gallon of gasoline. Under the combustion conditions prevailing in the engine, the lead oxide and other lead compounds which are formed are carried out of the engine in the exhaust gases. These compounds are for the most part lead oxide and lead halides, such as lead chloride and lead bromide, and complexes of these compounds.

When a catalytic exhaust purifier containing a bed of oxidation catalyst is employed to catalytically oxidize carbon monoxide and the organic constituents of the exhaust gases, these lead compounds tend to deposit upon and accumulate within the catalyst bed which is advantageous from the standpoint that the bed acts as a filter to remove these undesirable contaminants and prevent their escape to the atmosphere, but which is disadvantageous in that these compounds tend to reduce the oxidation activity of the catalyst and eventually render it unable to carry on its intended function of oxidizing the undesirable oxidizable fumes.

In accordance with the present invention it has been found that it is possible, in the operation of a catalytic purifier on engines using leaded gasoline, to periodically treat the catalyst without removing it from the purifier so as to remove lead compounds accumulating thereon and restore the catalyst to essentially its original activity. It has been found that this can be accomplished by periodically flowing a liquid reagent through the exhaust purifier in contact with the catalyst which is capable of dissolving and thus removing the lead compounds from the catalyst. This treatment is then followed by a flushing treatment in which the liquid reagent is rinsed from the catalyst, and finally the wet catalyst is dried in place by the heat of the exhaust gases from the engine. The ease and simplicity of the regeneration treatment as provided by the present invention, which may be accomplished entirely without removal of the catalyst from the purifier in which it is housed, makes practical the frequent treatment of the catalyst for the removal of the accumulated lead compounds and restoration of its activity. As will be pointed out hereinafter, relatively frequent treatment of the catalyst in this manner results in a substantial reduction in the amount of lead compounds escaping to the atmosphere as well as maintaining the catalyst close to its optimum activity for the oxidation of the oxidizable fumes present in the exhaust gases.

Reference is now made to the accompanying drawings in which Fig. 1 is a semi-diagrammatic illustration of a catalytic exhaust purifier showing the catalyst bed in the course of undergoing lead removal treatment in accordance with the invention, and Fig. 2 is a cross-sectional view taken on the line 2—2 of Fig. 1, and Fig. 3 is a view partly in elevation and partly in section taken on the line 3—3 of Fig. 1, and Fig. 4 is a semi-diagrammatic illustration of an automatic machine suitable for carrying out the lead removal treatment of the invention.

Referring now to Figs. 1–3, reference numeral 1 refers generally to a catalytic exhaust purifier consisting of a metal housing 2 having a catalyst bed consisting of small catalyst pellets 3 provided therein, the catalyst pellets being supported between a pair of horizontally disposed foraminous plates or grids 4. The foraminous grids 4 are preferably composed of a high temperature alloy such as an 18–8 stainless steel and are perforated over their entire area, the perforations being for example 1/16" in diameter and spaced from one another on 1/16" centers. These grids may be supported within the housing 2 in any desired manner taking due care to allow for thermal expansion and contraction arising due to the high and varying temperatures existing within the catalyst bed during operation of the purifier. Suitable ways to arrange the grids 4 and to support them within the housing are described and claimed in copending applications Serial Number 318,382, filed November 3, 1952, now Patent No. 2,776,875, and Serial Number 406,442, filed January 27, 1954, now Patent No. 2,795,488.

Preferably, the bed of catalytic pellets supported between the foraminous grids 4 is divided into a plurality of compartments by means of transverse baffles 5 which prevent the catalyst pellets, which preferably are not tightly packed between the grids 4, from migrating to one end of the catalytic muffler under the influence of movements and tilting of the vehicle to which the purifier may be attached.

One end of the housing 2 is closed by an end plate 6 which is bolted to a flange on the housing. An outlet pipe 7, having approximately the same width as housing 2 (see Fig. 3) is attached to the end plate 6, for conducting the exhaust gases from the purifier to the atmosphere.

The other end of the purifier is connected by a pipe 8 to the engine manifold in the same manner as a conventional acoustical muffler. The exhaust gases from the engine, prior to entering the purifier, pass through a venturi inspirator designated generally by the reference numeral 9 consisting of an insert member 10, converging in the direction of flow and an insert member 11 which converges and then diverges in the direction of flow, the members 10 and 11 together providing a restriction to produce a reduced pressure at point T, less than atmospheric, such that air from the surrounding atmosphere is sucked in through the openings 12 as indicated by the arrows, and mixed with the exhaust gases flowing from the engine into the purifier.

As the exhaust gases flow into the purifier they enter into a chamber 13 which serves to mix the inspirated air with the exhaust gases and also acts as a settling chamber to drop out any heavy particles of carbon or inorganic particles such as iron oxide which may be carried in with the exhaust gas stream.

As may be seen, the bed of catalytic pellets extends horizontally for substantially the full length and width of the housing and divides the interior of the housing into an upper chamber A and a lower chamber B. The exhaust gases from the engine flow from the mixing chamber 13 into the upper hcamber A, through the perforated grids 4 and in contact with the catalyst, into the chamber B and leave the purifier through the outlet pipe 7. The lower chamber B is closed off from the mixing chamber 13 by means of inperforate plate 14 which extends transversely of the housing 2.

In the operation of the purifier as shown, the exhaust gases from the engine flow through the venturi inspirator 9 and are thus mixed with sufficient air to provide the oxygen required for efficient catalytic oxidation of the combustible constituents contained therein. This mixture flows into the chamber 13, into the upper chamber A and then downwardly through the catalyst bed where the oxidizable constituents are catalytically oxidized at the surface of the catalyst. In order to insure effective catalytic oxidation of the carbon monoxide, hydrocarbons and oxygenated organic compounds contained in the exhaust gases, the bed of catalyst should be maintained at average temperatures ranging from 800° to 1300° F. and preferably in the range of from about 900° to 1200° F. Maintenance of the catalyst within the range of these temperatures under ordinary driving conditions is possible through the heat released by the oxidation of the combustible constituents in the gases, particularly the carbon monoxide which is the most abundant oxidizable material in the exhaust gas. In order to maintain these temperatures, care should be taken not to dilute the exhaust gases with excessive quantities of air and likewise provision must be made for the exhaust gases to pass through the bed of catalytic pellets at a velocity sufficiently low to avoid cooling the catalyst bed below its threshold activation temperature (approximately 500° to 600° F.) at times when the exhaust gases are below this temperature, such as at idling conditions when ordinarily exhaust gas temperatures range from 150° to 250° F.

Catalysts which are useful in accordance with the invention include activated metal oxides, such as activated alumina, activated beryllia, activated magnesia, activated zirconia, activated thoria, or mixtures of such oxides such as a mixture of activated alumina and beryllia, which are impregnated with relatively small amounts of catalytically active metals such as platinum, silver, copper, nickel, or combinations such as a combination of copper and chromium. A suitable catalyst for use in accordance with the invention may be prepared, for example by impregnating activated alumina with a 1% solution of chloroplatinic acid, followed by decomposition of the chloroplatinic acid to deposit finely divided platinum on the alumina. Catalysts of this type are capable of operating at the relatively high temperature level necessary for efficient elimination of the oxidizable fumes in the exhaust gases and at the same time are capable of withstanding the treatment for the removal of lead compounds which is practiced in accordance with the invention.

The catalyst bed is preferably made of pellets composed of such materials, relatively small in size, ranging from $\frac{1}{32}$" to $\frac{3}{8}$" and preferably from $\frac{1}{16}$" to $\frac{1}{4}$" in average dimensions. Particularly preferred are cylindrical pellets ranging from $\frac{1}{16}$" to $\frac{1}{4}$" in diameter and having approximately the same length. When catalytic pellets in such a size range are employed, the bed operates as a relatively efficient filter with respect to the particles of lead compounds issuing from the engine.

The amount of catalytic surface required to provide for efficient elimination of the oxidizable constituents of the exhaust gases depends somewhat upon the relative activity of the particular catalyst. With a platinum-on-alumina catalyst, for example, and using cylindrical pellets $\frac{1}{8}$" in diameter and length, a minimum of approximately 10 cubic centimeters of catalyst (dumped volume including voids) will be required for each cubic inch of piston displacement to provide efficient clean-up of the oxidizable constituents under ideal conditions. Preferably, for reasons explained hereafter, an amount of catalyst greater than the minimum catalyst requirements is employed such as two to four times the ideal minimum.

When such a catalytic purifier is used with an engine operating on leaded gasoline, as explained previously, the particles of lead compounds issuing from the engine in the exhaust gases tend to accumulate on and within the catalyst bed. By regulating the temperature of the bed below a maximum of 1300° F., and preferably below 1200° F., the particles of lead compound accumulating within the bed are prevented from reaching their melting point. If the operating temperature of the bed much exceeds 1300° F. and particularly at bed temperatures of 1500° F. and over, fusion of the lead compounds on the surface of the catalyst occurs. This apparently creates an impervious coating completely preventing access of the gases to the catalyst surface, since when such fusion occurs, the activity of the catalyst is immediately drastically reduced. With an engine operating under average conditions, and using a catalyst bed of relatively small pellets, the operating temperature of the bed will generally remain below 1300° F. However if the air-fuel ratio is abnormally low, or if the engine is in poor mechanical condition, such that an abnormally high concentration of oxidizable material is exhausted from the engine, the catalyst bed temperature may exceed 1400°–1500° F., with resulting fusion of lead compounds on the catalyst surface. In such case, the lead removal treatment provided in accordance with this invention may be employed to remove the fused coating of lead compounds and restore the catalyst to substantially its initial activity.

While maintaining the temperature of the catalyst bed within the proper range will prevent such rapid drastic reduction in activity, there is even at moderate temperatures a relatively slow decline in the activity of the catalyst as the lead particles accumulate in the bed. While the invention does not depend on any particular theory, it is probable that this relatively slow decline in activity is due to the physical coating of the catalyst with, and/or accumulation in its pores of the fine particles of lead compounds which prevents the free access of the exhaust gases to the surface of the catalyst. It has been found surprisingly, that the rate of accumulation of the lead compounds in the bed is relatively rapid at first and then tends to reach an equilibrium condition as the concentration of these compounds in the bed increases as is shown by the table below.

| Hours of operation of purifier with engine using leaded gasoline | Lead accumulation in catalyst bed, percent by weight of catalyst ||
|---|---|---|
| | 3.0 cc. tetraethyl lead solution per gallon | 0.6 cc. tetraethyl lead per gallon |
| 25 | 1.0 | 0.4 |
| 50 | 1.7 | 0.8 |
| 75 | 1.9 | 1.0 |
| 100 | 2.3 | 1.2 |
| 125 | 2.5 | 1.3 |
| 150 | 2.7 | 1.4 |
| 200 | 2.9 | |

The decline in catalyst activity which accompanies the accumulation of lead compound follows the same pattern, namely, decline being relatively rapid at first and tapering off as the concentration of lead compounds in the bed increases. For example, a given volume of fresh catalyst may effect the elimination of substantially 100% of the oxidizable constituents in the exhaust gases, while after 50 or 60 hours of use on an engine using leaded gasoline the degree of elimination may drop to 90%; after 100 hours of operation, the degree of elimination may drop to 85%; and after 150 hours drop to 75%.

In order to remove the lead compounds and restore the catalyst to substantially its original activity without necessitating its removal from the purifier, the purifier is provided in accordance with the invention with means for introducing a liquid reagent into the purifier housing. As shown in Fig. 1, the bottom portion of the muffler housing is provided with an inlet fitting 15 to which a suitable flexible hose or other conduit may be attached for the introduction of a liquid reagent into the housing. At the opposite end of the housing an outlet 17 is provided which may be connected to a suitable conduit 18.

When it is desired to treat the catalyst for the removal of the lead compounds, it is merely necessary to remove the plugs (not shown) which close the openings 15 and 17 when the purifier is in use and to connect the conduits 16 and 18 respectively thereto and then to pump the liquid reagent into the purifier housing and through the catalyst bed as shown in the drawing. During this operation, the outlet pipe 7 may be closed with a rubber or plastic plug 19 or other suitable closure means. In the arrangement shown in Fig. 1, it may be seen that the liquid entering through the inlet opening 15 flows upwardly through the perforations in the foraminous grids 4, through the catalyst bed in contact therewith and then flows from the top grid into the sump provided at the bottom of the settling chamber 13 then out through the outlet 17.

In contacting the liquid with the catalyst bed, care should be taken to insure thorough contact by suitably choosing the flow rate of the liquid as it is pumped through the bed to insure turbulence and agitation of the catalyst. In some cases it may be desirable to provide a pulsating or reversing flow to provide such suitable agitation and contact.

Generally speaking, any liquid reagent capable of dissolving and removing lead compounds from the surface of the catalyst may be employed. Aqueous solutions containing mineral or organic acids such as nitric or acetic acid, or aqueous salt solutions such as solutions of lead acetate, ammonium chloride, calcium chloride, strontium chloride may be employed, the choice of a particular reagent being dictated by the type of oxidation catalyst employed and the comparative convenience and effectiveness of the various reagents. For a platinum type catalyst, for example, a relatively dilute solution such as a 5% or 10% solution of nitric acid is preferable since such a solution very effectively dissolves and removes the lead compounds with the solution at atmospheric temperatures and has a minimum corrosive effect upon the carbon steel components of the exhaust purifier with which it may come in contact. In cases where the purifier contains unprotected carbon steel components with which the reagent may come in contact, the use of corrosive hydrochloric acid solutions or chloride solutions is preferably avoided. With other types of catalysts, such as an activated alumina pellet impregnated with a combination of metals such as copper-chromium, nitric acid should not be used since this will dissolve out the catalytic metal from the alumina. In such case, a reagent such as ammonium acetate which will dissolve the lead but not effect the catalyst itself should be used.

After contact with the acid solution or other reagent for dissolving and removing the lead, the solution is drained from the purifier and then the catalyst bed is flushed with water introduced in a similar manner into the purifier in order to remove the reagent from the catalyst and to rinse the components of the purifier itself.

After sufficient rinsing with water, the purifier is then drained and the plugs closing the openings 15 and 17 are then replaced. The catalyst at this point is thoroughly wet with water. In order to dry the catalyst to render it once again capable of catalytically oxidizing combustible fumes in the exhaust gases, the engine is started and exhaust gases permitted to flow through the catalyst bed and to effect drying thereof. It has been found surprisingly, that this method of drying the catalyst pellets in situ can be accomplished quickly and without damage to the catalyst. It has been found in fact that the first layer of catalyst pellets contacted by the exhaust gas stream tends to dry first under the effect of the hot exhaust gases and that this dry layer immediately begins to promote the catalytic oxidation of the oxidizable fumes thereby releasing heat and raising the gas temperature to higher levels which promotes the faster drying of the remainder of the bed. Catalyst bed temperature measurements during drying show that the temperature of the catalyst bed increases above the level attributable to the entering temperature of the exhaust gases well before drying is complete thus indicating that catalytic oxidation with accompanying release in heat is going on in some portions of the bed before the entire bed is dry. Thus, in contrast to the use of heated air or other drying gas from an extraneous source, the use of the exhaust gases themselves to effect drying of the catalyst not only dispenses with an expensive and cumbersome item of drying equipment but also permits the drying to be accomplished at a faster rate than with air or other drying gas at an equivalent temperature. When the drying operation is completed the catalyst, free from its accumulation of lead compounds, is restored to its initial activity.

The frequency of treatment for the removal of lead compounds necessary to maintain the catalyst at a good level of activity so as to insure the oxidation of a high percentage of the oxidizable constituents of the exhaust fumes will vary somewhat, but will generally be of the order of one such treatment each fifty to four hundred hours of operation. In general, the rate of lead accumulation and rate of activity decline will increase in direct proportion to the concentration of lead in the gasoline, higher lead concentrations accordingly requiring more frequent treatment. The frequency of treatment necessary to obtain satisfactory elimination of oxidizable fumes can be decreased by using an excess of catalyst over that minimum required for a satisfactorily high degree of elimination when the catalyst is substantially lead-free. Thus in some cases, it may be desirable to use from two to four times such minimum amount of catalyst to prolong the intervals between lead-removal treatments.

The net amount of lead removed which would otherwise pass to the atmosphere with respect to the total amount exhausted from the engine will vary depending on the frequency of the lead-removal treatment. This results from the fact, previously pointed out, that the rate of lead accumulation in the bed is more rapid when the bed is lead-free and gradually declines as the lead concentration in the bed builds up. Apparently the effectiveness of the bed as a filter for the particles of lead compounds decreases with increasing concentration of such particles in the bed. Where the lead-removal treatment is carried out at intervals of about 50 to 200 hours of operation using a catalyst bed made up of relatively small pellets of from 1/16″ to 1/4″ in average dimensions, approximately 30% to 90% of the total lead issuing from the engine will be trapped in the bed and thus prevented from being released as a contaminant to the atmosphere.

*Example*

A standard passenger car equipped with a standard 4-cycle spark-fired gasoline engine having a piston displacement of 216 cubic inches was equipped with a catalytic exhaust purifier of the general type illustrated in the drawings. The catalyst employed consisted of pellets, 1/8″ in diameter and length, composed of activated alumina and impregnated with approximately 0.3% by weight of platinum by immersion of the pellets in a solution of chloroplatinic acid containing 0.6% by weight of platinum, followed by drying and decomposition of the platinum salt. 8700 grams of such pellets were disposed in a horizontal bed between two perforated stainless steel grids in the manner shown in the drawings, the dimensions of the bed being 22 inches in length, 10 inches in width and 2½ inches in depth.

The automobile was operated under normal driving conditions for approximately 125 hours using leaded gasoline as a fuel, the lead content of the gasoline in the form of tetraethyl lead amounting to about 3 grams of lead per gallon of gasoline. At the beginning of the operation, the catalyst was essentially lead free. At the end of the 125 hours of operation, the catalyst was analyzed for lead and the catalyst bed was found to contain deposited in and on the catalyst an average of 1.9% by weight of metallic lead based on the weight of the catalyst.

For the removal of the lead, without removing the catalyst from the purifier, the following procedure was followed. A solution of nitric acid was prepared by mixing 1.8 litres of $HNO_3$ (70%) with 16.2 litres of clear tap water. Such a solution may be used repeatedly before becoming exhausted and at ambient temperatures has little corrosive effect on unprotected carbon steel components of the purifier. This solution, at ambient temperature, was pumped through the purifier in the manner indicated in the drawings for a total of about 15 minutes. The acid solution was then drained and the catalyst bed was then flushed with tap water pumped through the purifier and the catalyst bed at the rate of about 4 gallons per minute for about 15 minutes after which the system was drained free of water. Flushing was again started at the same rate and in two minutes the drain water showed non-acidic by litmus test. Flushing was continued for an additional 8 minutes so that the entire flushing took 25 minutes.

Samples of the catalyst after the above procedure were tested for lead and were found to be substantially lead free (less than 0.01% by weight of lead found).

After draining the water from the system, the catalyst was dried by operating the vehicle over a period of about 15 minutes under normal driving conditions. During the drying, visible condensed steam could be seen at the tail pipe for about 13 minutes and then ceased. During the drying operation, the average exhaust gas inlet temperature to the catalyst bed was approximately 500° F. As the drying proceeded the temperature prevailing in the catalyst bed was recorded by means of thermocouples inserted into the center of the bed at five points ($t_1$ to $t_5$) corresponding to the center of the five catalyst compartments in the purifier shown in Fig. 1. The results are shown in the table below:

| Type of operation | Minutes | Exhaust gas temperature entering bed, ° F. | Catalyst bed temperature, ° F. | | | | | Remarks |
| --- | --- | --- | --- | --- | --- | --- | --- | --- |
| | | | $t_1$ | $t_2$ | $t_3$ | $t_4$ | $t_5$ | |
| Acceleration and deceleration | 2 | 600 | 150 | 150 | 150 | 150 | 150 | Steam. |
| Idle | 2 | 400 | 150 | 150 | 150 | 150 | 150 | Do. |
| 30 M. P. H | 2 | 450 | 150 | 150 | 150 | 150 | 250 | Do. |
| 40 M. P. H | 2 | 625 | 150 | 175 | 450 | 175 | 550 | Do. |
| 50 M. P. H | 2 | 780 | 525 | 600 | 850 | 850 | 925 | Steam unsteady. |
| Acceleration and deceleration | 3 | 610 | 900 | 900 | 925 | 940 | 925 | Steam stopped. |
| 35 M. P. H | 5 | 610 | 740 | 710 | 710 | 710 | 680 | |
| Acceleration and deceleration | 1½ | 700 | 950 | 980 | 1,025 | 1,025 | 1,125 | |
| Idle | ½ | 610 | 1,000 | 980 | 1,050 | 1,050 | 1,150 | |
| Do | 5 | 400 | 1,050 | 1,050 | 1,060 | 1,080 | 1,125 | |

It is apparent from the above table that after about 8 minutes of operation, the catalyst bed was partially active in catalytically oxidizing fumes in the exhaust gases, thereby helping to hasten the drying of the bed. After drying, examination of the catalyst showed it to be in excellent physical condition and continued operation of the purifier showed that the catalyst was restored essentially to the level of activity (as measured by the degree of elimination of oxidizable fumes in the exhaust gases) as it had when the operation was initiated with the lead-free catalyst.

Reference is now made to Fig. 4 of the drawing which shows an automatic apparatus suitable for performing the lead removal operation which is adapted for use by the personnel of any gasoline service station. With the apparatus shown, the lead removal treatment can be performed with ease and simplicity in about the same time required for the usual 1000 to 2000 mile service lubrication of the ordinary passenger vehicle.

The reference numeral 20 indicates a housing which may be conveniently mounted on casters 21. The housing has a hinged top 22 permitting access to its interior for service and replenishing the reagent solutions. A flexible hose 16 is connected to a fitting 16a and is adapted for attachment to the inlet 15 of the purifier housing 1. A return line 18 connected to a fitting 18a is adapted for connection to the outlet 17 from the purifier housing. A service line 23 adapted for connection to any standard electrical circuit is provided for operation of the pumps, valves and other electrically operated components of the system. An inlet line 24, which may be a flexible hose connection, and controlled by manually operated valve 25, is provided to supply the required flush water for the system.

In the interior of the housing, a tank 26 of corrosion-resistant material is provided for containing the reagent solutions for the lead removal operation. Water may be introduced into this tank to make up the solution through line 27 by a manually controlled valve 28.

The reagent solution is withdrawn from the bottom of tank 26 by a reversible pump 32. The solution passes through solenoid controlled 2-way valve 30, filter 31, and line 33 and flexible hose connection 16 into the purifier housing. The reagent solution is returned to the tank 26 through flexible hose connection 18, line 34, solenoid operated 2-way valve 35 (in the position as shown in solid lines) and line 36.

Flushing water is supplied to the purifier housing by line 24 controlled by manually operated valve 25, line 37, solenoid operated valve 38, line 39, 2-way solenoid operated valve 30, filter 31, pump 32, line 33, and flexible hose connection 16. During the flushing cycle, flushing water leaves the purifier housing by flexible hose connection 18, line 34, 2-way solenoid operated valve 35 (in a position as shown in dotted lines), line 40 and line 41 which is connected to drain 42.

A solenoid operated valve 43 is provided in line 44 which in turn is connected into lines 33 and 41 for the purpose of draining the purifier housing through lines 16 and 33.

For the purpose of draining the tank 26 when the reagent solution is expended, line 45, controlled by a manually operated valve 46, is provided which connects with drain 42.

A timer 47 is provided which may be set from the exterior of the housing as shown for controlling the operation of solenoid-operated valves 30, 35, 38, and 43 and for controlling the operation of the reversible pump 32. For the sake of simplicity, the electrical circuits connecting the timer to the solenoid operated valves 30, 35, 38 and 43 and to the reversible electric motor driving pump 32 have not been shown.

In the operation of the device shown in Fig. 4, the automobile to which the purifier is attached (generally in the same general location as conventional acoustical muffler) is elevated by a hydraulic lift and the connections as shown in Fig. 4 made. With the unit connected to a source of water and electric current as shown, the timer switch is set for the beginning of the cycle. Manually operated valve 25 is open while manually operated valves 28 and 46 are closed.

At the beginning of the cycle solenoid operated valve 30 is shown in the position indicated in solid lines. The pump 32 is operated in a direction so as to pump solution from the tank 26 through line 33 and hose connection 16 into the purifier housing, out through flexible hose connection 18, through solenoid operated valve 35 in the position as shown in solid lines and then back to tank 26. During this part of the cycle, solenoid operated valves 38 and 43 remain closed.

After the desired treatment time, the timer rotates to the next position causing the pump 32 to reverse direction and thus pump all of the solution back into the tank 26.

In the next position of the timer, valve 30 is rotated to its second position as shown in dotted lines, valve 38 opens, and pump 32 again reverses direction so as to pump water from line 37 through valves 38 and 30, filter 31, and through lines 33 and 16 into the purifier housing and out through line 18. At this time valve 35 also rotates to its second position as shown in dotted lines to permit the flush water to pass through lines 40 and 41 and finally to drain 42.

At the end of the flushing cycle, the timer rotates to the next position at which time pump 32 stops and valve 43 opens permitting the flushing water in the purifier housing to drain out through lines 16, 33, 44 and 41 to drain. If desired, the flush and drain cycles may be repeated to insure complete washing of the catalyst.

At the end of the cycle, lines 16 and 18 are merely disconnected from the purifier housing, openings 15 and 17 closed by replaceable plugs, and the drying of the catalyst accomplished by normal operation of the vehicle as previously described.

From the foregoing it is apparent that the present invention provides a convenient, simple and inexpensive method and apparatus for both removing considerable quantities of lead compounds from the exhaust stream which otherwise would pass to the atmosphere as a contaminant while at the same time maintaining the oxidation catalyst close to its peak efficiency for the catalytic oxidation of oxidizable fumes in the exhaust stream. It is understood that other variations within the spirit of the invention not specifically disclosed are also intended to be included within the scope of the appended claims.

We claim:

1. In the operation of a catalytic exhaust purifier for engines using leaded gasoline, a method for the removal of lead compounds which deposit upon and accumulate within the bed of oxidation catalyst in said purifier resulting in the lowering in activity of the catalyst which comprises the steps of periodically flowing through the purifier in contact with said catalyst bed a liquid reagent for dissolving and thereby removing said lead compounds without dissolving or damaging said oxidation catalyst, removing said reagent leaving said catalyst bed wet therewith, and thereafter effecting drying of said wet catalyst by operating the engine and pasing hot exhaust products mixed with air through said wet catalyst thereby effecting partial drying and concomitant partial activation thereof by means of the sensible heat content of said exhaust gases, continuing the flow of exhaust gases and air through said partially activated catalyst thereby effecting catalytic oxidation of a portion of the oxidizable constituents of said gases thereby rapidly completing the drying and activation of the remainder of said catalyst bed.

2. In the operation of a catalytic exhaust purifier for engines using leaded gasoline and employing oxidation catalyst comprising an activated metal oxide support carrying a finely divided metallic deposit having oxidizing activity, a method for the removal of lead compounds which deposit upon and accumulate within the bed of oxidation catalyst in said purifier resulting in the lowering of the activity of the catalyst which comprises the steps of periodically flowing through the purifier in contact with said catalyst an aqueous solution of a reagent for dissolving and thereby removing said lead compounds without dissolving or damaging the components of said catalyst, removing said reagent and flushing said bed with water thereby leaving said catalyst bed in a wet condition, effecting drying of said wet catalyst by operating the engine and passing the hot exhaust products mixed with air through said wet catalyst thereby effecting partial drying and concomitant partial activation thereof by means of the sensible heat content of said exhaust gases, continuing the flow of exhaust gases and air through said partially activated catalyst thereby effecting catalytic oxidation of a portion of the oxidizable constituents of said gases thereby rapidly completing the drying and activation of the remainder of said catalyst bed.

3. A method in accordance with claim 2 in which the catalyst employed is a platinum on alumina catalyst and in which the reagent solution consists of a dilute solution of nitric acid.

4. A method in accordance with claim 2 in which the catalyst employed is a copper containing catalyst, and in which the reagent solution consists of a solution of ammonium acetate.

5. A method for the purification of exhaust gases from engines using leaded gasoline, involving the simultaneous removal of lead compounds therefrom and the catalytic oxidation of oxidizable constituents thereof which comprises the steps of flowing said exhaust gases and air through a purifier containing a bed of relatively small pellets of oxidation catalyst, maintaining said bed at an elevated temperature such as to insure the catalytic oxidation of the oxidizable constituents thereof, while at the same time collecting in said bed a substantial portion of the lead compounds present in the exhaust gases, continuing the operation of said purifier until the accumulation of said lead compounds substantially effects the activity of the oxidation catalyst, and periodically flowing through the purifier in contact with said catalyst bed an aqueous solution of the reagent capable of dissolving and thereby removing said lead compounds without dissolving or damaging said catalyst, draining and then flushing said bed with water, effecting drying of said wet catalyst by operating the engine and passing the hot exhaust products mixed with air through said wet catalyst thereby effecting partial drying and concomitant partial activation thereof by means of the sensible heat content of said exhaust gases, continuing the flow of exhaust gases and air through said partially activated catalyst thereby effecting catalytic oxidation of a portion of the oxidizable constituents of said gases thereby rapidly completing the drying and activation of the remainder of said catalyst bed.

6. A method in accordance with claim 5 in which said purifier is operated at a temperature sufficiently high to insure effective catalytic oxidation of the oxidizable constituents of said exhaust gases but below temperatures at which substantial fusion of lead compounds in the catalyst bed occurs.

7. A method in accordance with claim 5 in which the catalyst bed is made up of particles ranging in size from about 1/32" to 3/8" in average dimension such that the bed operates as a filter for the particles of lead compound exhausted from the engine.

8. A method in accordance with claim 5 in which the periodic treatment of the catalyst with a liquid reagent is performed at intervals of from 50 to 400 hours of operation of the engine.

References Cited in the file of this patent

UNITED STATES PATENTS

| | | |
|---|---|---|
| 1,828,146 | Joseph | Oct. 20, 1931 |
| 1,845,000 | Wollin | Feb. 16, 1932 |
| 1,867,325 | Neville | July 12, 1932 |
| 1,919,626 | Finn | July 25, 1933 |
| 2,664,340 | Houdry | Dec. 29, 1953 |
| 2,704,281 | Appell | Mar. 15, 1955 |

OTHER REFERENCES

Mellor: "Comprehensive Treatise on Inorganic and Theoretical Chemistry," volume VII, Longmans Green and Co., New York, N. Y., 1927, pages 690 and 716.